(12) United States Patent
Kimura (10) Patent No.: US 6,804,734 B2
(45) Date of Patent: Oct. 12, 2004

(54) DEVICE AND METHOD FOR SWITCHING RECEIVING/RECORDING DEVICE IN A BROADCASTING CONNECTION/POINT-TO-POINT CONNECTION BUS ENVIROMENT

(75) Inventor: Yuji Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 09/789,154

(22) Filed: Feb. 20, 2001

(65) Prior Publication Data

US 2001/0025327 A1 Sep. 27, 2001

(30) Foreign Application Priority Data

Feb. 21, 2000 (JP) ........................................ 2000-042301

(51) Int. Cl.$^7$ ............................................... G06F 13/42
(52) U.S. Cl. ........................ 710/106; 710/100; 710/104; 710/105; 709/220; 709/223; 700/3
(58) Field of Search ................................. 710/100, 104, 710/105, 106, 124, 8, 72; 700/3; 709/203, 220, 223; 348/559; 382/232; 340/825.22

(56) References Cited

U.S. PATENT DOCUMENTS

| | | | | |
|---|---|---|---|---|
| 5,719,942 A | * | 2/1998 | Aldred et al. ................ | 709/228 |
| 5,909,183 A | * | 6/1999 | Borgstahl et al. ....... | 340/825.22 |
| 5,973,722 A | * | 10/1999 | Wakai et al. .................. | 725/76 |
| 6,032,202 A | * | 2/2000 | Lea et al. ........................ | 710/8 |
| 6,038,625 A | * | 3/2000 | Ogino et al. ................. | 710/104 |
| 6,040,873 A | * | 3/2000 | Izumi et al. ................. | 348/559 |
| 6,052,750 A | * | 4/2000 | Lea .............................. | 710/72 |
| 6,085,236 A | * | 7/2000 | Lea .............................. | 709/220 |
| 6,199,136 B1 | * | 3/2001 | Shteyn ........................ | 710/305 |
| 6,286,071 B1 | * | 9/2001 | Iijima .......................... | 710/124 |
| 6,289,169 B1 | * | 9/2001 | Okuyama ..................... | 386/83 |
| 6,363,449 B1 | * | 3/2002 | Sides et al. .................. | 710/100 |
| 6,389,466 B1 | * | 5/2002 | Zondag ....................... | 709/221 |
| 6,453,071 B2 | * | 9/2002 | Ito et al. ...................... | 382/232 |
| 6,466,971 B1 | * | 10/2002 | Humpleman et al. ....... | 709/220 |
| 6,513,064 B1 | * | 1/2003 | Horiguchi et al. .......... | 709/223 |
| 6,546,419 B1 | * | 4/2003 | Humpleman et al. ....... | 709/223 |
| 6,560,635 B1 | * | 5/2003 | Lea et al. .................... | 709/203 |
| 6,600,958 B1 | * | 7/2003 | Zondag ......................... | 700/3 |
| 6,647,448 B1 | * | 11/2003 | Brelin ......................... | 710/107 |

OTHER PUBLICATIONS

M.V. Pitke and T. Chandrasekaran, "A Communication Switch based on Parallel Processing", 1993, IEEE, Proceedings of IEEE Singapore International Conference, vol. 2, Sep., 1993.*

(List continued on next page.)

*Primary Examiner*—Xuan M. Thai
*Assistant Examiner*—Justin King
(74) *Attorney, Agent, or Firm*—Frommer Lawrence & Haug LLP; William S. Frommer (57) ABSTRACT

An information processing device, method thereof and a recording medium for easily switching input signals. A broadcast connection and a point-to-point connection are established between the receive device and the transmit device. When the user commands the canceling of the P.P. connection established for the receive device or the transmit device, only the broadcast connection remains established. In this state, the user receives signals on a receive device sent from the desired transmit device, and commands the restoring of the P.P. connection with the desired transmit device. The switching of input signals to the receive device is in this way performed by temporarily canceling the P.P. connection.

14 Claims, 8 Drawing Sheets

OTHER PUBLICATIONS

Gaylord Richards and Frank Hwang, "A Two–Stage Rearrangeable Broadcast Switching Network", 1985, IEEE, IEEE Transavtions on Communications, vol. 33, Issue 10, pp 1025–1035.*

Daniel Moore, "IEEE 1394, The Cable Connection to Complete the Digital Revolution", Skipstone, Inc., http://www.vxm.com/21r.49.html.*

Jerry Fife, "IEEE 1394 Brings Bandwidth, Simplicity, Lower Costs to Machine Vision, Scientific Imaging", Sony Electronics Inc., http://www.broadcastpapers.com/data/ieee01.htm.*

IEEE Computer Society, "IEEE Standard for a High Performance Serial Bus", 1995, IEEE. pp 24–31.*

IEEE Computer Society, "IEEE Standard for a High Performance Serial Bus", 1995, IEEE. p 158.*

Dmn Software Inc. "Consumre Audio/Video Equipment—Digital Interface (IEC 61883)", http://www.dmn.at/info/iec61883/iec61883-en.html.*

IEEE Computer Society, "IEEE Standard for a High Performance Serial Bus", 1995, IEEE. pp. 24–31.*

* cited by examiner

DEVICE AND METHOD FOR SWITCHING RECEIVING/RECORDING DEVICE IN A BROADCASTING CONNECTION/POINT-TO-POINT CONNECTION BUS ENVIROMENT

BACKGROUND OF THE INVENTION

1. Field of the Invention

The present invention relates to an information processing device, method thereof and a recording medium and relates in particular to an information processing device, method thereof and a recording medium ideal for utilization in devices connected to a digital bus such as IEEE1394 bus, etc.

2. Description of the Related Art

Along with the advances of digital technology in recent years, the use of networks to mutually connect devices by a digital bus has gradually spread. One example of a digital bus is the IEEE1394 digital serial bus. As an isochronous channel resource method for the IEEE1394 digital serial bus the applicants previously proposed, in Japanese Patent Application No. 350077/1999, a method to prevent conflicts from occurring among devices set with different channels, and transmit and receive channels set in advance for each device, when devices connected to the IEEE1394 bus are transmitting and receiving signals.

In this proposed method, the device set as the receiver is in standby awaiting input of signals from a channel set in advance, the transmitter device sends the signal on the preset channel without designating the receiver of the signal and thus allows passive transmission and reception of the signal. Channel setting of this kind is implemented by broadcast connections (hereafter, "B.C. connection") specified in the IEEE1394 standards or the IEC-61883-1 standards, and the set channel is called the default channel.

The overall concept of the default channel is based on the precondition that when the transmit device has been changed such as by a user operation, a new device can transmit signals on the same channel. The new transmit device captures (takes over) the previously established B.C. connection and transmits signals over that captured channel so that the input signals are now switched to the receive device without the receive device performing any operation.

A point-to-point (P.P.) connection is established and overlapped onto the already established B.C. connection, when the receive device is to record the input signals onto an internal recording medium, etc. The point-to-point connection ensures that other signals will not be recorded if the transmit and receive channel the receive device uses to record signals, is captured by other devices.

Figure 1A:
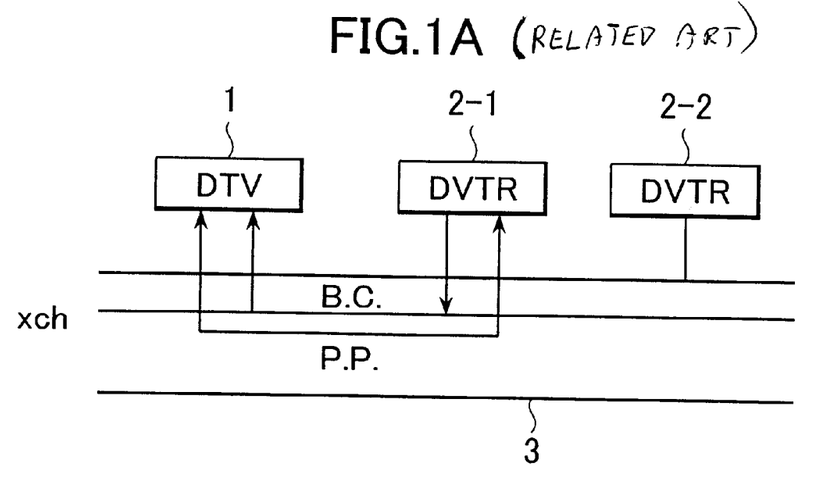
FIGS. 1A and 1B are drawings showing the connection of the related art.
Figure 1B:
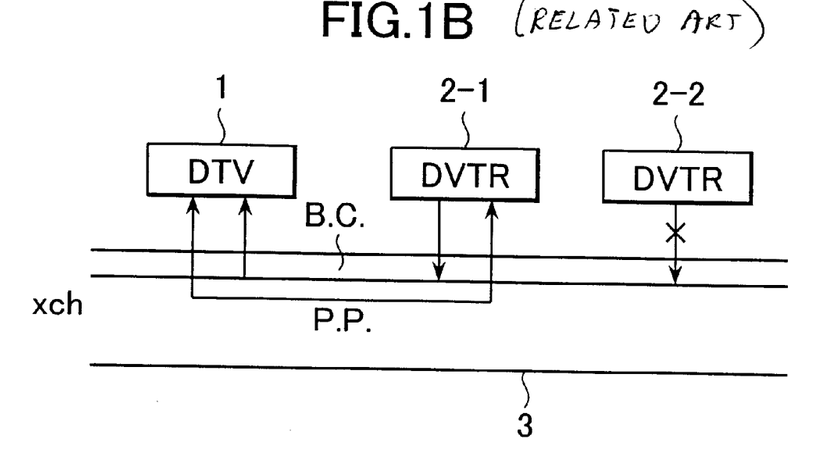

In this way, a P.P. connection is therefore overlapped onto the previously established B.C. connection as described above when the receive device is recording input signals, so other transmit devices therefore cannot capture that channel. Such an arrangement is described while referring to FIG. 1.

In the status shown in FIG. 1A, a DTV (digital television receiver) 1, a DVTR (digital video tape recorder) 2-1, and a DVTR 2—2 are mutually connected to an IEEE1394 bus 4 as shown in FIG. 1A, and when a DVTR 2-1 has started video recording, a P.P. connection is overlapped onto the B.C. connection between the DTV 1 and the DVTR 2-1. When the DVTR 2-1 for example, has started recording, a P.P. connection is overlapped onto the B.C. connection between the DTV 1 and DVTR 2-1. When the user views/hears a signal from DVTR 2—2 the next time, a P.P. connection is already established at DTV 1 with the DVTR 2-1, so the channel cannot be captured. Consequently, the DTV 1 cannot input the signal from the DVTR 2 (DVTR 2—2 cannot output signals to DTV 1). The user cannot therefore view/hear signals from DVTR 2—2.

As described above, a channel management method of this kind based on B.C. connections has the problem that the input signal cannot be switched when a P.P. connection has been established such as by starting a recording operation.

Figure 2A:
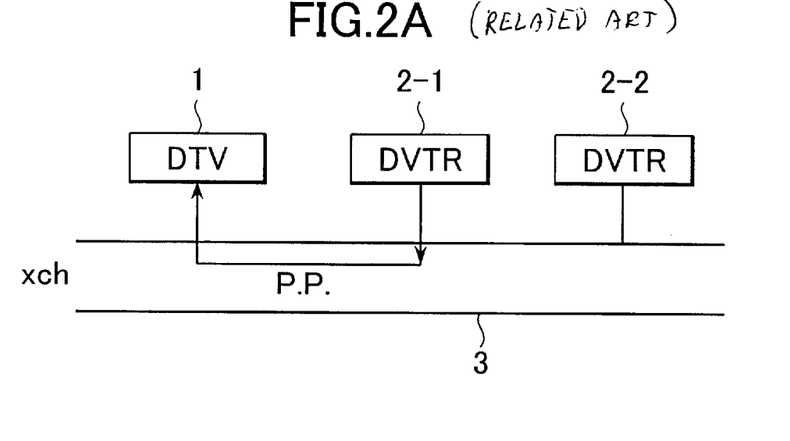
FIGS. 2A and 2B are drawings showing another connection of the related art.
Figure 2B:
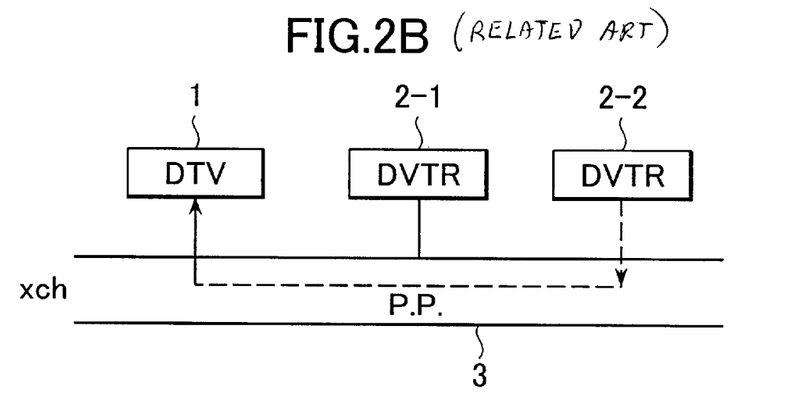
Figure 2C:
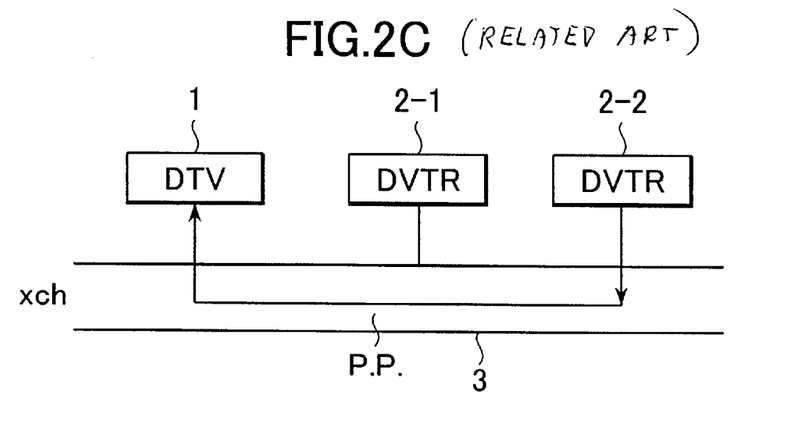

A channel management method based on P.P. connections instead of being based on B.C. connections was proposed in the related art. In this method, an isochronous signal send/receive connection was established by utilizing P.P. connections in all devices connected by an IEEE1394 bus. A method of this kind is described while referring to FIG. 2.

When the DTV 1 and DVTR 2-1 must be changed from the P.P. connection shown in FIG. 2A, to the P.P. connection of DTV 1 and DVTR 2—2 as shown in FIG. 2C, the user first of all severs the connection between DTV 1 and DVTR 2. That connection is severed by stopping the play operation for example by pressing the DVTR 2-1 stop button. The user from the DTV 1 side, then selects DVTR 2—2 as the connection target, and starts outputting the signal in DVTR 2—2 for example by pressing the play button.

In a channel management method of this kind based on P.P. connections, every time a change is made in the transmit device for transmitting signals that the user wants to view/hear, the user must use the receive device, to select the signal input destination (transmit source) constituting the transmit device, and then must arrange the processing so that the signal is output with the selected transmit device. Having to make settings on both the transmit device and the receive device in this way is exceedingly troublesome for the user.

SUMMARY OF THE INVENTION

In view of the above-mentioned problems with the related art, this invention has the object of reducing the number of user operations by allowing the elimination or restoration of P.P. connections overlapped onto B.C. connections and thus provide a device convenient for the user.

The information processing device of the present invention, along with establishing a broadcast connection, comprises: first establishing means for establishing a point-to-point connection on the broadcast connection channel, cancel means for canceling point-to-point connections established by the first establishing means, and second establishing means for establishing on the channel, the point-to-point connection canceled by the canceling means.

The device having a point-to-point connection established by the second establishing means may comprise a device having a point-to-point connection established by the first establishing means, a device outputting information input when the point-to-point connection of the second establishing means was established, and a device designated by the user.

The information processing device of the present invention further comprises memory means from among at least one of: information relating to the device with a broadcast connection and a point-to-point connection established by the first establishing means, information relating to a device exchanging data with a broadcast connection established when the point-to-point connection was canceled by the cancel means, and information relating to a device with a point-to-point connection established by the second establishing means.

The information processing device of this invention as described above, along with establishing a broadcast connection, also establishes a point-to-point connection on the broadcast connection channel, and cancels and restores the established point-to-point connection, and so is capable of easily switching the input information (device).

In the specifications of the present invention, the steps describing the program provided by the medium are of course performed in a time sequence according to the order the steps are listed. However the processing of these steps need not always be implemented in a time sequence and the steps may be implemented in serial or in parallel. Also in the specifications of the present invention, the term "system" indicates the overall device comprising a plurality of devices.

DETAILED DESCRIPTION OF THE PREFERRED EMBODIMENTS

Figure 3:
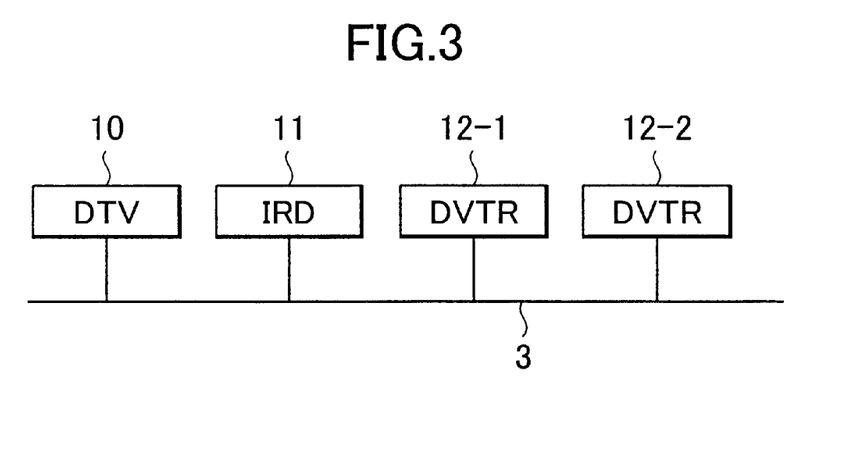
FIG. 3 is a drawing showing the structure of the embodiment of the information processing system of this invention.

The embodiment of the present invention is hereafter described in detail while referring to the accompanying drawings. FIG. 3 is a drawing showing the structure of the embodiment of the information processing system of this invention. As shown in FIG. 3, the DTV 10, the IRD (Integrated Receiver Decoder) 11, the DVTR 12-1 and the DVTR 12-2 are mutually connected by way of the IEEE1394 bus 3.

Figure 4:
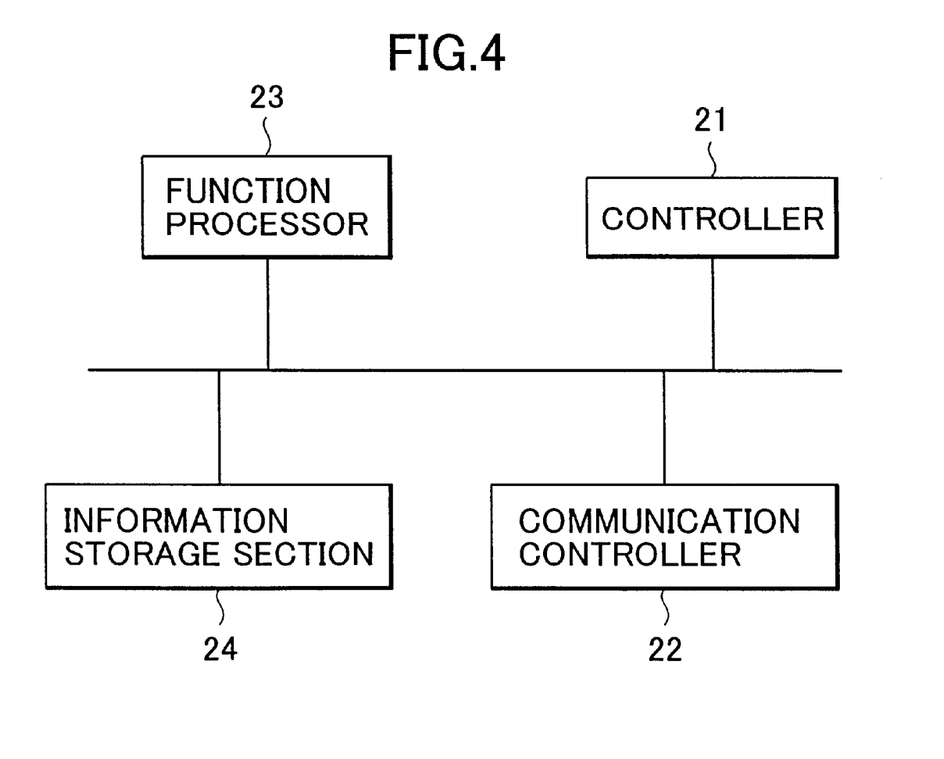
FIG. 4 is a drawing showing the internal structure of the device shown in FIG. 3.

FIG. 4 is a drawing showing the internal structure of the devices connected to the IEEE1394 bus 3, that is, the DTV 10, the IRD 11, the DVTR 12-1 and the DVTR 12-2 in the embodiment shown in FIG. 3. A controller 21 controls the processing of the function processor 23 based on control signals input from a remote controller (not shown in drawing) or a communication controller 22 by way of the IEEE1394 bus 3. The function processor 23 performs the characteristic functions of the device. The function processor 23 in the case of the DTV 10 for example, outputs the image display and audio based on the input signals, and in the case of the DVTR 12-1, 12-2 performs recording and play.

An information storage section 24, besides storing the programs and signals (data) required for control and processing by the controller 21 and the function processor 23, also stores information relating to the connections as described later on.

Figure 5:
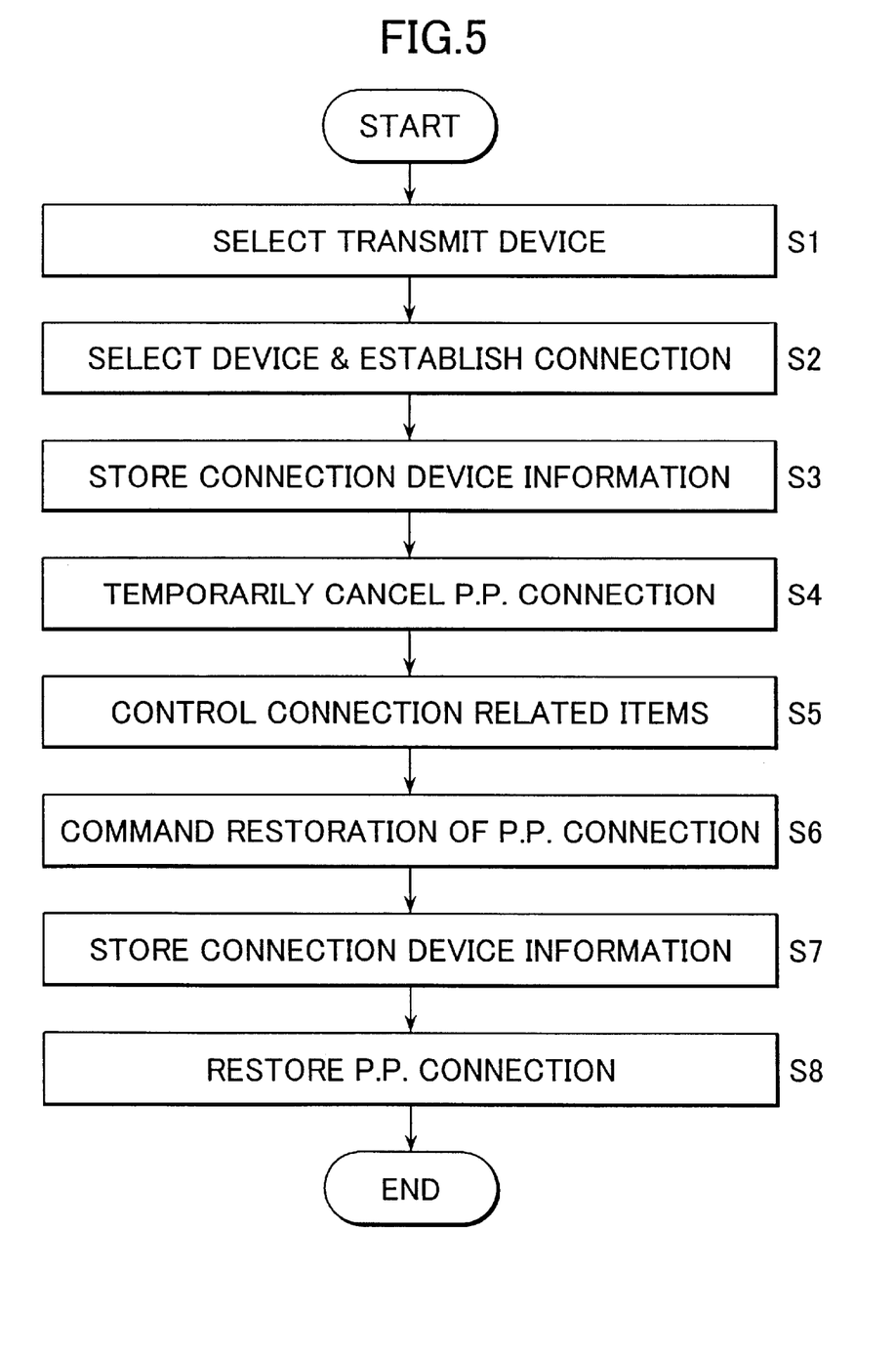
FIG. 5 is a flowchart illustrating the operation of DTV 10.

The switching of signals inputted to DTV 10 in a system comprising a device having this kind of structure is described while referring to the flowchart of FIG. 5. In step S1, the user selects the transmit device (signal transmission source) from the menu displayed on the screen of the DTV 10. The menu is displayed on the DTV 10 when the DTV 10 power is turned on or when display of the menu was commanded by a user operation such as with the accessory remote controller for the DTV 10.

Figure 6:
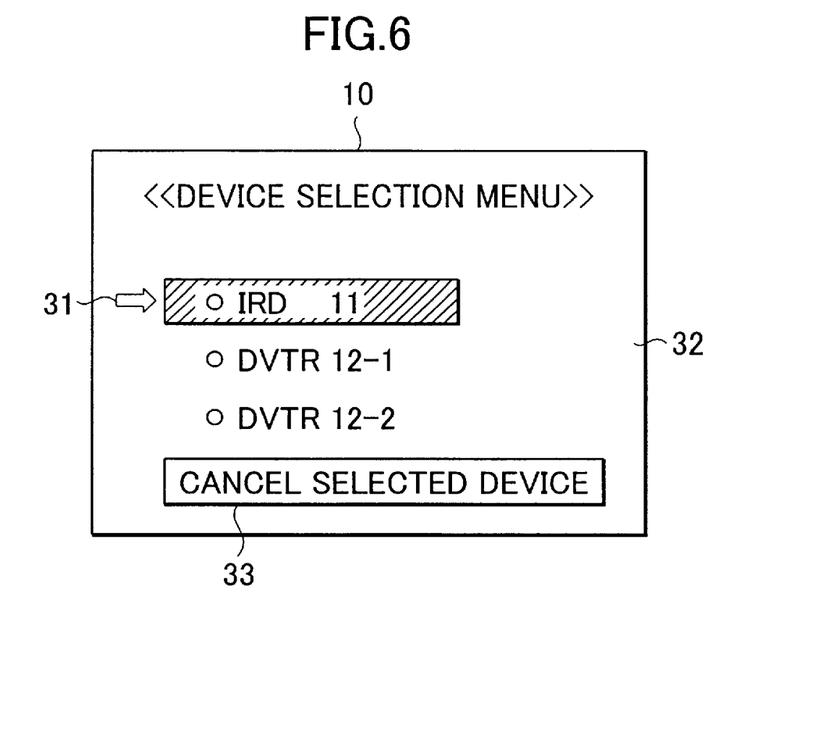
FIG. 6 is a typical display shown on DTV 10.

FIG. 6 shows an example of a menu as the GUI (Graphical User Interface) displayed on the DTV 10. The user selects a desired device as the transmit device from the devices displayed on the device list display 32 by operating the cursor 31 with a remote controller, etc. Devices available as transmit devices from among the devices connected to the IEEE1394 bus 3 are displayed in a list format on the device list display 32.

The device name where the cursor 31 is positioned is displayed with a color to allow that device name to be distinguished from the other device names. The colors of the letters are highlighted by inverting the colors of the letters on the display. Besides the device name where the cursor 31 is positioned, the device name connected to the DTV 10 at that time may also be displayed in the same way to allow recognition of the display by the user.

A connection change box 33 is provided below the list display 32. This connection change box 33 is selected when the user desires to cancel (display state in FIG. 6) the connection or restore (described later) the connection with the device designated as the transmit device.

In step S1, when the user selects the desired transmit device from the display screen as shown in FIG. 6, a connection is established with the selected transmit device, in step S2. For example, when the IRD 11 was selected as the transmit device, in step S2, a B.C. connection is established between DTV 10 and IRD 11 on the same channel simultaneous with the P.P. connection.

In the processing of step S1 when the power for DTV 10 is turned on, instead of the user selecting the desired transmit device from the menu, the connected device from the previous time before the power was turned off may instead be selected as the default transmit device. The DTV 10 may be set so that the IRD 11 is always selected as the default transmit device.

In step S2, when the connection is established with the device selected as the transmit device, the DTV 10 stores information on the connected equipment in the information storage section 24. In step S3, information for distinguishing the various devices such as the node ID or the global unique ID is the information stored in the information storage section 24. When this kind of information is stored in the information storage section 24 in the processing of step S3, signals in this case received and processed by the IRD 11 are inputted to the DTV 10 by way of the IEEE1394 bus, and the user commences viewing/hearing the desired program.

In step S4, the P.P. connection is temporarily canceled. In this operation, when for example, the user is viewing the desired program based on signals supplied from the IRD 11, and wants to view a program based on signals supplied from the DVTR 12-1, the user performs the specified operation to display the menu such as shown on FIG. 6. The user then moves the cursor 31 to the connection change box 33, and cancels the established P.P. connection in this case between the DTV 10 and the IRD 11 by making a selection.

Figure 7:
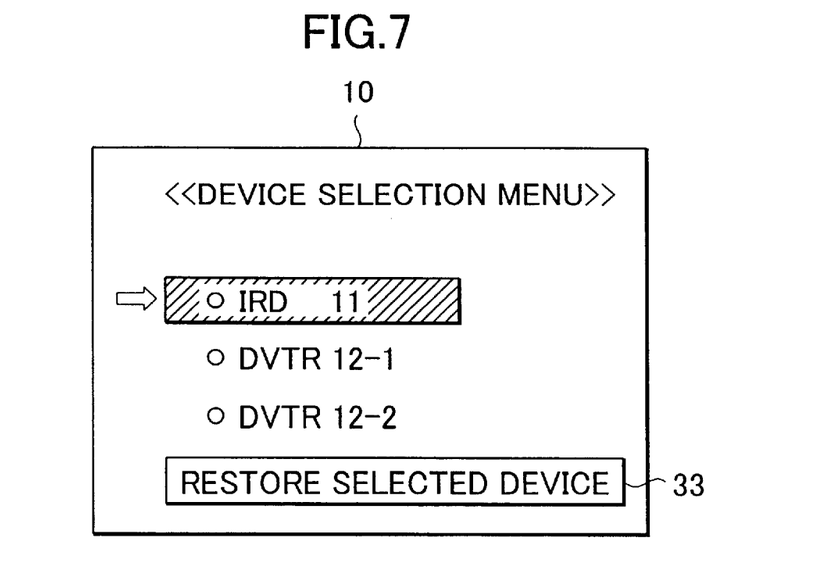
FIG. 7 is another typical display shown on DTV 10.

When the connection is canceled, the menu screen shown in FIG. 6 switches to the menu screen shown in FIG. 7. In other words, the display on the connection change box 33 switches from, "Cancel Selected Device" to "Restore Selected Device".

In step S4, when the P.P. connection is canceled, the processing proceeds to step S5, and connection related control commences. Only the B.C. connection is still established on the DTV 10 when the P.P. connection is canceled. Therefore, the DTV 10 is in a state capable of inputting the signals transmitted on the channel utilized by the B.C. connection. The user then commands play by performing the specified operation on for example, DVTR 12-1, and when the DVTR 12-1 in compliance with the play command, commences output of the signal on the channel utilized for the B.C. connection, that signal is inputted to the DTV 10 and video and audio are output based on that signal.

The user can in this way, view/hear programs from the desired device. Further, when the user has issued a play command to the DVTR 12-2, the DVTR 12-2 takes over (captures) the B.C. connection channel and outputs signals on that channel so that the user can view/hear the program based on signals from the DVTR 12-2.

In this way, the P.P. connection can be canceled, and the input signal (transmit device) switched to signals from the desired device just for example by issuing a play command to the desired device.

In step S6, when a P.P. connection restore command is output, information on the transmit equipment for which restoring of the P.P. connection was commanded, is stored in the information storage section 24 in step S7. The command to restore the P.P. connection involves the user deciding the desired program for viewing/hearing by switching the signals input by the DTV 10 (by switching to the program for viewing per the DTV 10), and for example calling up a menu screen such as shown on FIG. 7, and from that menu selecting the device to supply the desired program.

The selection of the transmit device from the menu is the same process as in step S1 and is performed by the user moving the cursor 31 to the desired device name. Restoring the connection (in this case, the connection with IRD 11) to the P.P. connection before cancellation can be performed by selecting "Restore Selected Device" of connection change box 33 from the menu as shown in FIG. 7.

Further, after the P.P. connection is canceled, a timer may be utilized so that when the signal from one device for example, was continuously input for five minutes or longer, a B.C. connection is overlapped onto the P.P. connection with that device. When utilizing a timer, the status of the transmit device having only a B.C. connection must always be known. When the restoring of a P.P. connection is commanded by means of this kind of processing, the node ID (Global Unique ID) of the transmit device only having a B.C. connection established, is stored in the information storage section 24.

When information on the transmit device specified for restoration of the P.P. connection, is stored in step S7, the process proceeds to step S8 and the P.P. connection with that transmit device is implemented.

Figure 8A:
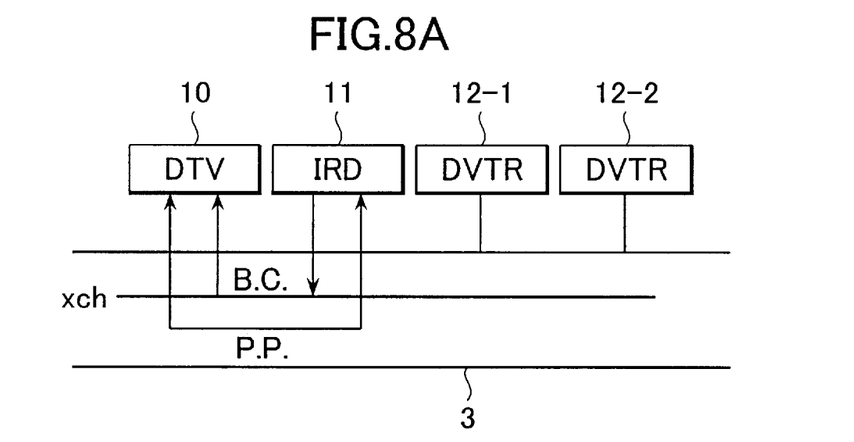
FIGS. 8A to 8C are drawings for describing the connection method of the present invention.

The above-mentioned processing is further described while referring to FIG. 8. In the processing in steps S1 through S3, a B.C. connection and a P.P. connection are established on the same channel (on channel X) between the DTV 10 and the IRD 11 as shown in FIG. 8A. Since the connections are set up so that only one signal is exchanged on one channel, in a state with the two connections of a P.P. connection and a B.C. connection established, one signal is handled by a mode for those two connections.

Figure 8B:
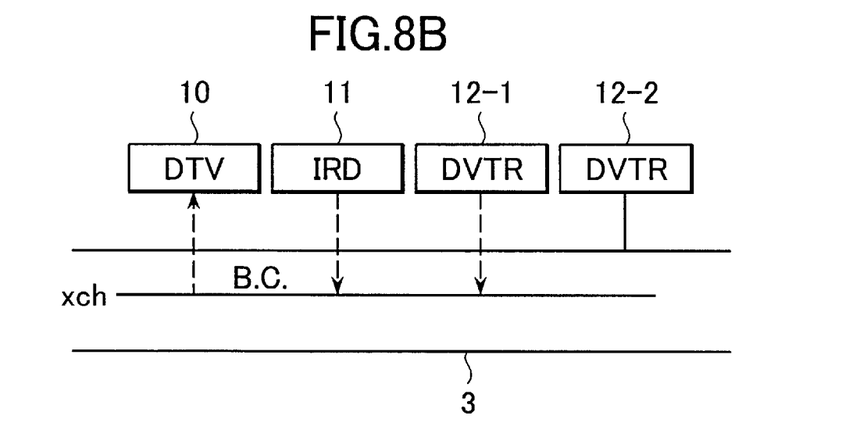

In the state with a P.P. connection and a B.C. connection established shown in FIG. 8A with the user inputting signals to DTV 10, when switching of switching from IRD 11 to DVTR 12-1 is commanded, then as shown in FIG. 8B, the P.P. connection established between DTV 10 and IRD 11 is canceled (processing in step S4). Control for connection with DVTR 12-1 is then performed in the processing of step S5 so that as shown in FIG. 8C, the DTV 10 and DVTR 12-1 exchange data on the B.C. connection of the X channel (Xch).

In this state, when the user in step S6 commands the restoring of the original connection (Connection change box 33 was selected on the menu shown in FIG. 7.) the status as shown in FIG. 8A is returned to, by implementing steps S7 and S8.

Figure 8C:
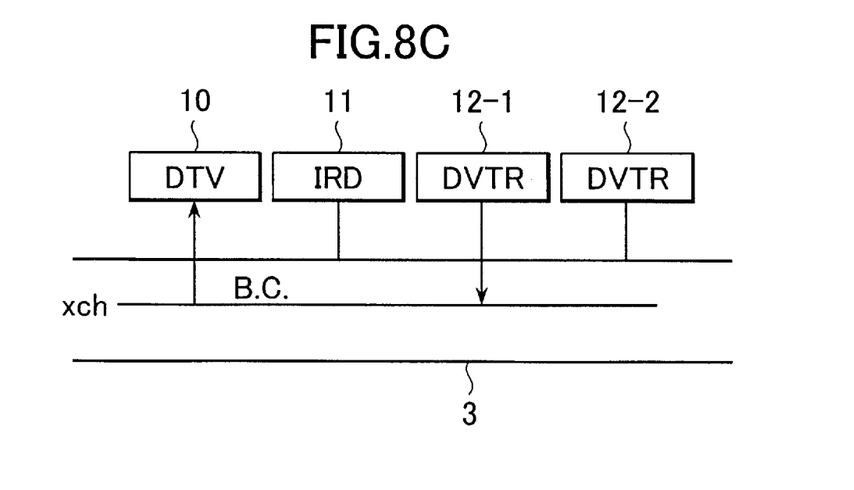
Figure 9:
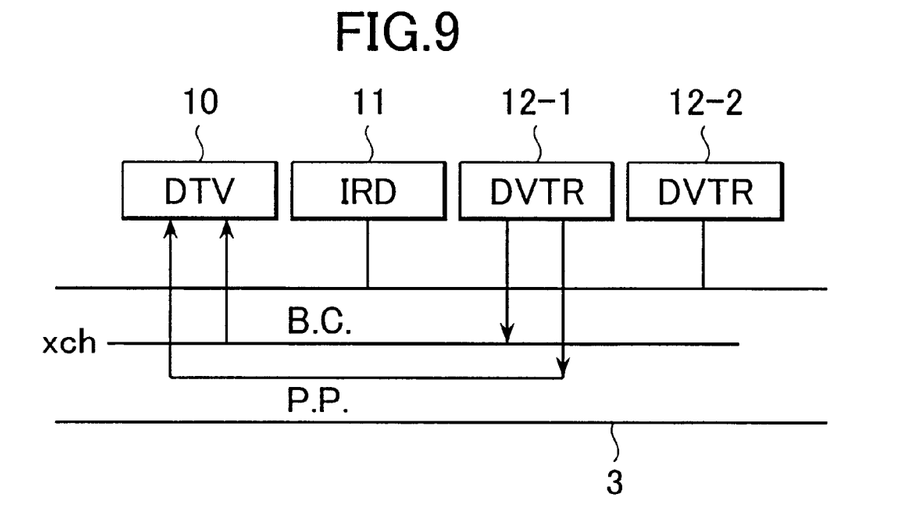
FIG. 9 is a drawing for describing the connection method of the present invention.

As shown in FIG. 8C, in a connection status with signals from DVTR 12-1 inputted to the DTV 10, if the connection is maintained for example, for five minutes or longer, then a P.P. connection is overlapped onto the B.C. connection as shown in FIG. 9, between the DTV 10 and the DVTR 12-1.

Figure 10:
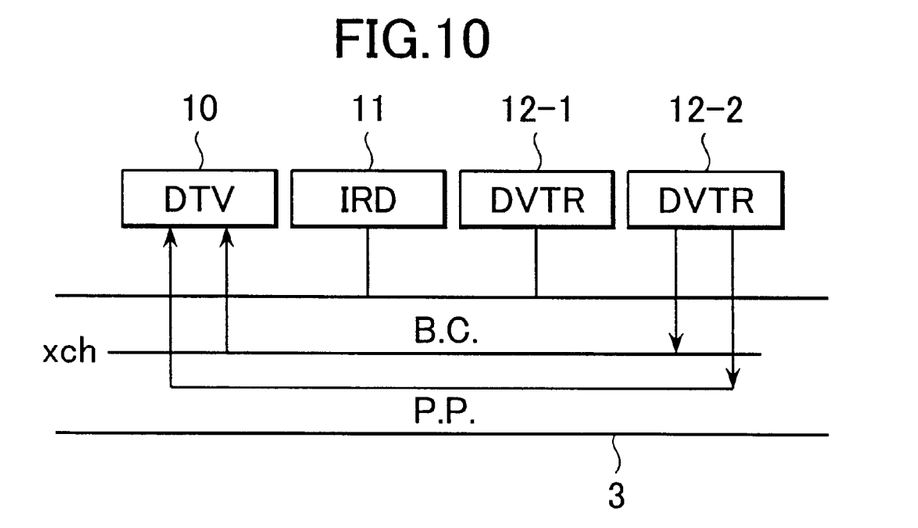
FIG. 10 is a drawing for describing the connection method of the present invention.

Also, when the menu has been called up and the DVTR 12-2 was selected from the menu as the transmit device, then as shown in FIG. 10, a P.P. connection is established, overlapped onto the B.C. connection between the DTV 10 and the DVTR 12-2.

By canceling and restoring the P.P. connection in this way, the user can input (view/hear) signals from the desired device and at the desired timing.

The above processing sequence can be implemented by hardware yet can also be implemented by software. When implementing the processing sequence with software, the software can be installed from a recording medium onto for example a computer incorporating dedicated hardware installed with the programs, or for example the software can be installed as separate programs on a general-purpose personal computer capable of implementing all functions.

Figure 11:
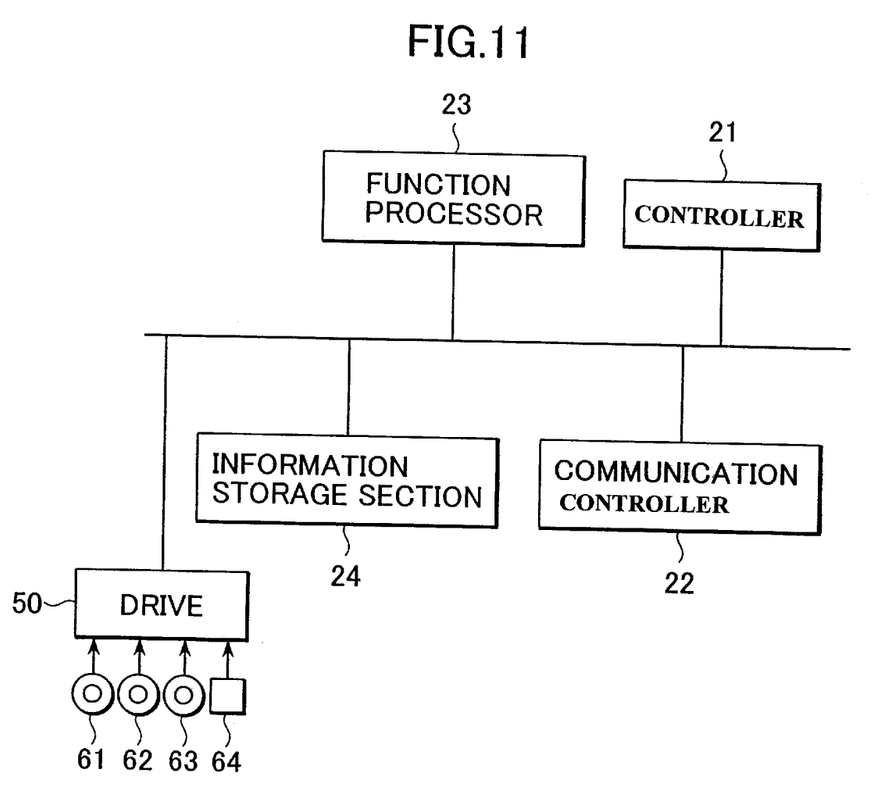
FIG. 11 is a drawing of the medium.

The recording medium may not only be constituted as shown in FIG. 11, by a magnetic disk 61 (including floppy disks) an optical disk 62 (including CD-ROM {Compact Disk Read Only Memory}, DVD {Digital Versatile Disk}), a magneto-optical disk 63 (including MD {Mini-disk}) or a packaged medium such as a semiconductor memory 64 distributed to provide programs to the user, but may also be provided to the user incorporated into the computer or on a hard disk containing programs stored on an information storage section 24.

What is claimed is:

1. An information processing device comprising:
    a plurality of external devices connected to each other via a bus, said bus including a plurality of channels;
    wherein said plurality of external devices includes at least one receiving device and at least two transmitting devices;
    selection means for allowing a user of said at least one receiving device to select at least one of said two transmitting devices;
    first establishing means for establishing concurrently a point-to-point connection and a broadcast connection between said at least said one receiving device and said one of said at least two transmitting devices on at least one of said plurality of channels of said bus; and
    switching means for allowing said user of said at least one receiving device to switch to a second of said at least two transmitting devices by canceling the point-to-point connection established by said first establishing means and permitting only said broadcast connection established by said first establishing means in order to perform desired operations when said switch occurs.

2. The information processing device according to claim 1, wherein said information processing device further comprises a second establishing means for establishing on at least one of said plurality of channels, said point-to-point connection canceled during said switch to said second of said at least two transmitting devices.

3. The information processing device according to claim 2, wherein said information processing device further comprises a timer, and after a specified amount of time elapses after signals are received from other external devices of said broadcast connection, a point-to-point connection is automatically established by said second establishing means on said broadcast connection.

4. The information processing device according to claim 2, wherein said device for establishing said point-to-point connection by said second establishing means is the device with said point-to-point connection established by said first establishing means, a device that outputs information input when said point-to-point connection was established by said second establishing means, or is a device specified by the user.

5. The information processing device according to claim 2, wherein said information processing device further comprises memory means from among at least one of: information relating to said device with said broadcast connection and said point-to-point connection established by said first establishing means, information relating to a device exchanging data with said broadcast connection established when said point-to-point connection was canceled during said switch to said second of said at least two transmitting devices, and information relating to a device with said point-to-point connection established by said second establishing means.

6. The information processing device according to claim 1, wherein said information processing device further comprises display means showing a menu for selecting external equipment to establish said broadcast connection and said point-to-point connection by said first establishing means.

7. An information processing method, comprising:
    a plurality of external devices connected to each other via a bus, said bus including a plurality of channels;
    wherein said plurality of external devices includes at least one receiving device and at least two transmitting devices;
    a selecting step for allowing a user of said at least one receiving device to select at least one of said two transmitting devices;
    a first establishing step for establishing concurrently a point-to-point connection and a broadcast connection between said at least said one receiving device and said one of said at least two transmitting devices on at least one of said plurality of channels of said bus; and
    a switching step for allowing said user of said at least one receiving device to switch to a second of said at least two transmitting devices by canceling the point-to-point connection established by said first establishing step and permitting only said broadcast connection established by said first establishing step in order to perform desired operations when said switch occurs.

8. The information processing method according to claim 7, wherein said information processing method further comprises a second establishing step for establishing on at least one of said plurality of channels, said point-to-point connection canceled during said switch to said second of said at least two transmitting devices.

9. The information processing method according to claim 8, wherein said information processing method further comprises a counting step for counting the time, and after a specified amount of time elapses after signals are received from other external devices of said broadcast connection, a point-to-point connection is automatically established by said second establishing step on said broadcast connection.

10. The information processing method according to claim 8, wherein said device for establishing said point-to-point connection by said second establishing step is the device with said point-to-point connection established by said first establishing step, a device that outputs the information input when said point-to-point connection was established by said second establishing step, or is a device specified by the user.

11. The information processing method according to claim 8, wherein said information processing method further comprises a storage step for storing at least one from among: information relating to said device with said broadcast connection and said point-to-point connection established by said first establishing step, information relating to a device exchanging data with said broadcast connection established when said point-to-point connection was canceled during said switch to said second of said at least two transmitting devices, and information relating to said device with said point-to-point connection established by said second establishing step.

12. The information processing method according to claim 7, wherein said information processing method comprises a display step showing a menu for selecting external equipment for establishing said broadcast connection and said point-to-point connection by said first establishing step.

13. A recording medium recorded with a program capable of being loaded by a computer, wherein said program comprises:
    a plurality of external devices connected to each other via a bus, said bus including a plurality of channels;
    wherein said plurality of external devices includes at least one receiving device and at least two transmitting devices;
    a selecting step for allowing a user of said at least one receiving device to select at least one of said two transmitting devices;
    a first establishing step establishes a point-to-point connection and a broadcast connection between at least said device and said one of said at least two transmitting devices on at least one of said plurality of channels of said bus; and
    a switching step for allowing said user of said at least one receiving device to switch to a second of said at least two transmitting devices by canceling the point-to-point connection established by said first establishing step and permitting only said broadcast connection established by said first establishing means in order to perform desired operations when said switch occurs.

14. The recording medium according to claim 13, wherein said program further comprises a second establishing step for establishing on at least one of said plurality of channels, said point-to-point connection canceled during said switch to said second of said at least two transmitting devices.

* * * * *